July 4, 1950 W. H. WINEMAN Re. 23,246

COMPRESSOR CONTROL MECHANISM

Original Filed Dec. 9, 1944 4 Sheets-Sheet 1

Inventor:
Wade H. Wineman.
by
Louis A. Maxson.
Atty.

COMPRESSOR CONTROL MECHANISM

Original Filed Dec. 9, 1944 4 Sheets-Sheet 2

Inventor:
Wade H. Wineman.
by
Paul A. Maxson.
Att'y.

July 4, 1950 W. H. WINEMAN Re. 23,246

COMPRESSOR CONTROL MECHANISM

Original Filed Dec. 9, 1944 4 Sheets-Sheet 3

Inventor:
Wade H. Wineman.
by Louis A. Maxson.
Atty.

COMPRESSOR CONTROL MECHANISM

Original Filed Dec. 9, 1944 4 Sheets-Sheet 4

Inventor:
Wade H. Wineman.
by
Paul A. Maxson
Att'y.

Reissued July 4, 1950 Re. 23,246

UNITED STATES PATENT OFFICE 23,246

COMPRESSOR CONTROL MECHANISM

Wade H. Wineman, Michigan City, Ind., assignor to Joy Manufacturing Company, a corporation of Pennsylvania Original No. 2,454,363, dated November 23, 1948, Serial No. 567,410, December 9, 1944. Application for reissue November 16, 1949, Serial No. 127,712

22 Claims. (Cl. 230—5)

Matter enclosed in heavy brackets [ ] appears in the original patent but forms no part of this reissue specification; matter printed in italics indicates the additions made by reissue

1

My invention relates to mechanisms for regulating the operation of compressors, and more particularly to mechanisms for regulating the speed of a driving motor for a compressor in accordance with the demand for compressed fluid.

In compressor systems in which a compressor is driven by an internal combustion engine for delivering compressed fluid to a receiving tank, it is customary to provide means which is responsive to the pressures in the tank for controlling the flow of pressure fluid relative to an unloading mechanism and for regulating the supply of operating fluid to the engine. When the receiver pressure reaches a maximum desired value, the pressure responsive means operates to supply pressure fluid to the unloading mechanism for effecting an operation of the latter to unload the compressor and, at the same time, reduces the supply of operating fluid to the engine so that it runs at an idling speed. On reduction of the receiver pressure to a predetermined lower value, the pressure responsive means operates to increase the supply of operating fluid to the engine and to vent the unloading mechanism, the venting of the unloading mechanism being such that the compressor is reloaded after the driving engine has been brought up to speed. If the driving engine is permitted to operate at maximum speed at all times when the compressor is loaded, there will be, under certain conditions of demand, for pressure fluid, a frequent unloading and reloading of the compressor, with changes in the engine speed between maximum and minimum. This results in an inefficient operation of the compressor system and in a rapid wearing of its parts. In order that there may be an unloading of the compressor less frequently, there should be provided means for reducing gradually the supply of operating fluid to the engine as the pressure in tre receiver increases through a predetermined range. To prevent the receiver pressure from dropping below minimum values when the demand for compressed fluid is at a maximum, the pressure point at which the means starts to reduce the engine speed should be somewhat above the minimum desired receiver pressure. The upper point of the range may be at any higher value and is desirably adjusted to a value somewhat below the pressure at which unloading takes place.

An object of my invention is to provide an improved speed regulating mechanism for a fluid compressor. Another object of my invention is to provide an improved mechanism for regulating the speed of a compressor in accordance with its discharge pressure. Still another object is to provide improved means for regulating the supply of operating fluid to a driving engine for a fluid compressor. Yet another object is to provide improved regulating means for reducing gradually the supply of operating fluid to a driving engine as the compressor discharge pressure increases through a predetermined range. Another object is to provide improved regulating means for progressively reducing the supply of operating fluid to a driving engine as a compressor driven thereby operates loaded and its discharge pressure increases between predetermined values, and operating at a pressure exceeding the higher of said predetermined values for reducing the supply of operating fluid to effect operation of the driving engine at an idling speed with the compressor unloaded. Still another object is to provide a speed regulating mechanism having a single element which is actuated by a plurality of pressure responsive devices for regulating the supply of operating fluid to an engine in an improved manner. These and other objects will appear more fully in the course of the following description:

2

In the accompanying drawings I have shown for purposes of illustration several forms which my invention may assume in practice.

Figure 1:
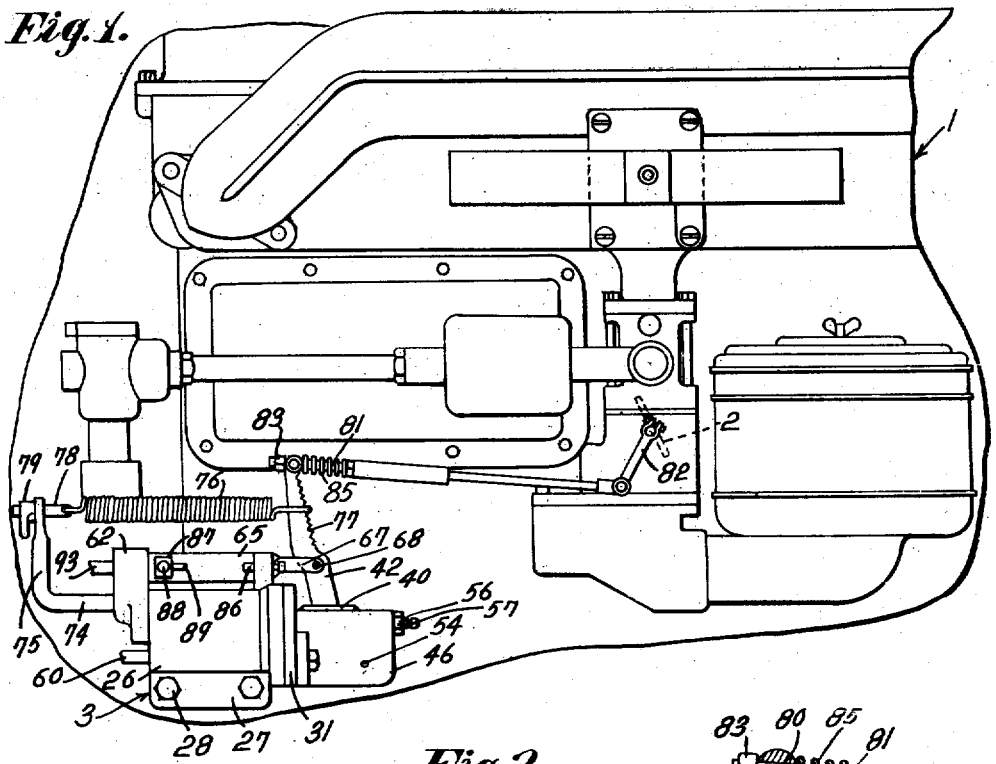
Fig. 1 is a side elevational view of an internal combustion engine having my improved regulating means in its preferred form associated therewith.
Figure 2:
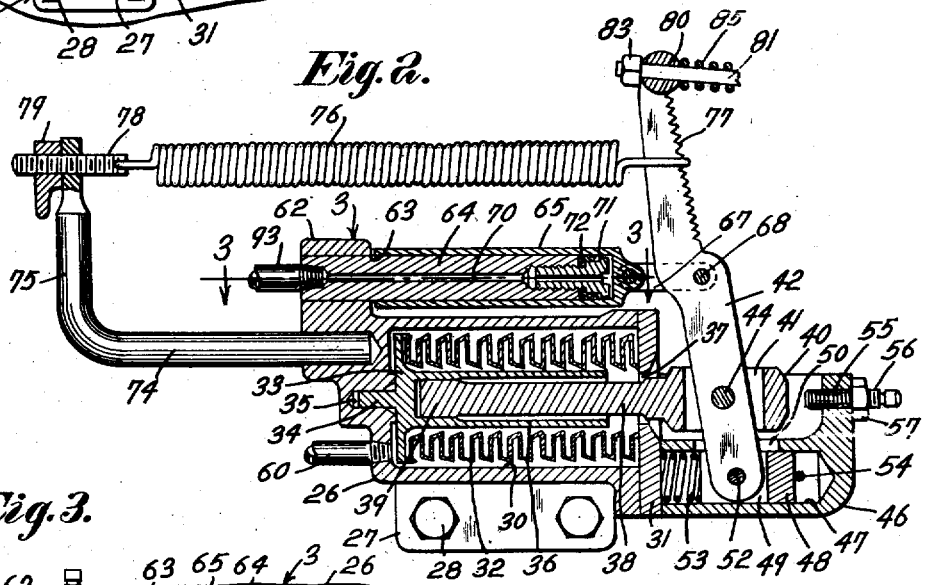
Fig. 2 is an enlarged vertical sectional view of the regulating mechanism shown in Fig. 1.

Referring to Figs. 1 to 6, it will be noted that my improved regulating mechanism in a preferred form is shown associated with an internal combustion compressor driving engine for controlling the supply of operating fluid to the latter in accordance with pressures in a receiver or a compressor system. The internal combustion engine, generally designated 1, has a throttle valve 2 which is regulated by my improved regulating mechanism, generally designated 3, and the engine has its power shaft operatively connected by means, not shown, to a compressor, one piston 5 of which is shown as reciprocable in a bore 6 of a compressor cylinder 7. It will of course be understood that other compressor pistons will normally be employed. Fluid is admitted through an intake passage 9 and past an inlet valve 10 to the cylinder bore 6 where it is compressed and discharged past a discharge valve 12 to a passage 13 which is connected by suitable connections, not shown, to a receiver 14, shown in Fig. 5. The cylinder is provided with a head member 15 having a chamber 16 which receives a piston 18 carrying a plate portion 19. Rods 20 are connected to the plate portion 19 and extend through openings in the cylinder head to engage the inlet valve 10 for unseating the latter and effecting an unloading of the compressor when the piston 18 is subjected to pressure fluid. The piston 18 is normally held in its raised position by a spring 22 and is adapted to be forced to its lower position against the action of the spring 22 by pressure fluid supplied to the chamber 16 through a conduit 24.

The improved regulating means 3 comprises a cylinder block 26 having a flange portion 27 which is adapted to be connected to the side of the engine, as by bolts 28. Formed in the cylinder block is a bore 30 opening through one end of the block and covered at its open end by a cover plate 31. Arranged in the bore 30 is a bellows device 32 which is connected at its ends, as by brazing, to the cover plate 31 and to a member 33 having a tongue portion 34 which is reciprocably received within a recess 35 formed in the cylinder block 26 at the inner end of the bore 30. The member 33 is provided with a sleeve portion 36 which projects axially through the bellows device 32 for a substantial distance. Formed in the plate member 31 is an opening 37 through which an elongated member 38 projects, and the inner end of this member 38 is provided with a portion 39 which is reciprocably received within the sleeve portion 36. The opening 37 provides a substantial clearance around the member 38 whereby the interior of the bellows device is connected in free communication with the atmosphere. At the outer end of the member 38 there is an enlarged portion 40 having an opening 41 through which a control lever 42 extends, and the control lever is pivotally connected to this enlarged portion by a transversely extending pin 44. Connected to the outer side of the cover plate 31 below the opening 37 is a support member 46 having a bore 47 which reciprocably receives a plungerlike member 48. The plungerlike member 48 is slotted transversely at 49, and the support member 46 is provided at the upper side of the bore 47 with an opening 50 through which the lower end of the control lever projects into the slot 49. A pin 52 pivotally connects the lower end of the control lever to the plunger 48. A spring 53 acts between the plunger 48 and the plate 31 for holding the plunger normally in engagement with a pin 54 extending transversely through the bore 47. The support member 46 is provided with an upwardly projecting portion having an opening 55 through which a screw 56 is threaded to a position where it is engageable by the enlarged end portion 40 of the elongated member 38. A lock nut 57 is provided for holding the screw 56 in its adjusted position. Pressure fluid is supplied continuously from the receiver 14 through a conduit 60 to the bore 30 where it acts on the bellows device 32 and tends to compress the latter. As the bellows device is compressed by the pressure fluid, the member 33 engages the inner end of the elongated member 38 and moves the latter in a direction to swing the control lever 42 about the pivot pin 52.

The cylinder block 26 is provided with an upwardly projecting portion 62 having an opening 63 extending therethrough, and an elongated member 64 has one end fixed securely within the opening 63 and projects forwardly from the portion 62 with its axis substantially parallel to the axis of the bore 30. Slidably mounted on the member 64 is a sleeveshaped member 65 which is closed at its outer end and is pivotally connected by a link 67 to a pin 68 carried by the control lever 42. Extending longitudinally through the member 64 is a passage 70 for conducting pressure fluid to the interior of the sleeveshaped member 65 adjacent its closed end. Threadedly connected to the outer end of the member 64 is a head piece 71 clamping a packing 72 in position to prevent the escape of fluid longitudinally along the inner wall of the sleeveshaped member 65.

Fixed to one end of the cylinder block 26 is a rod-like member 74 having an upwardly bent portion 75, and a spring 76 has one of its ends engageable with a toothed section 77 of the control lever 42 and its other end connected to a screw 78 which extends through an opening in the upwardly bent portion 75. A nut 79 is threaded on the outer end of the screw 78 and engages the rod portion 75 for holding the spring 76 in its adjusted position.

Figure 3:
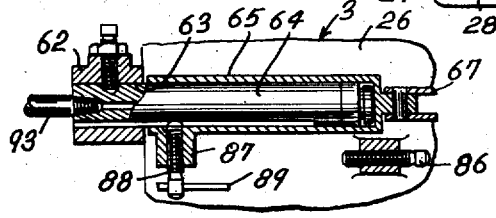
Fig. 3 is a horizontal sectional view taken on the plane of the line 3—3 of Fig. 2.
Figure 4:
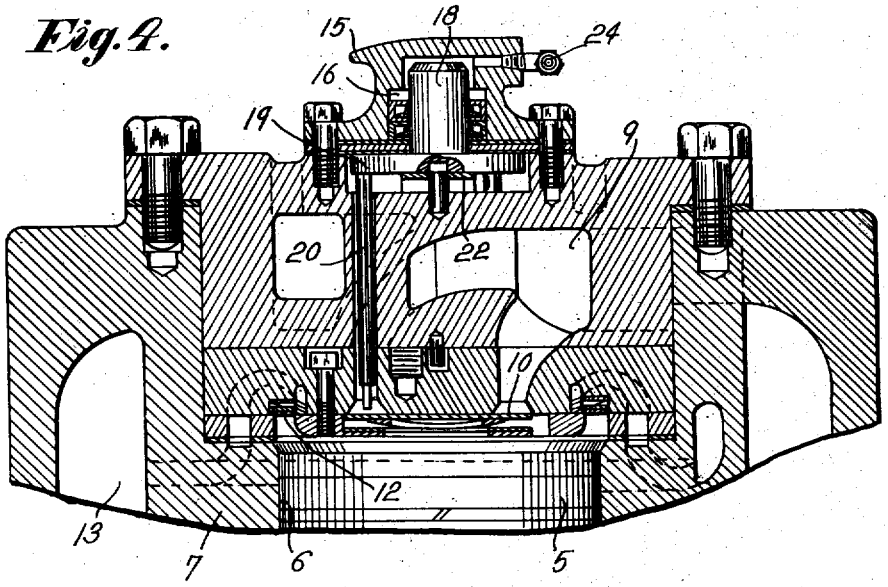
Fig. 4 is a central sectional view through the cylinder head and a portion of the cylinder of a compressor adapted to be driven by the engine of Fig. 1.

The upper end of the control lever 42 is provided with an opening 80, and a rod 81, connected at one end to an arm 82 attached to the throttle valve 2, extends freely through the opening 80 and has a nut 83 threaded on its outer end for preventing release of the rod 81 from the control lever 42. Fixed to the rod 81 is a sleeve member 84, and a spring 85 acts between this sleeve member and the control lever 42 so that movements of the control lever in a clockwise direction, as shown in Fig. 1, operate through the spring 85 for moving the throttle valve 2 in a closing direction. Movement of the control lever 42 by the supply of pressure fluid to the interior of the sleeve 65 is limited, as shown in Fig. 3, by an abutment pin 86 which is engageable by a projecting boss portion 87 formed on the sleeve member 65. In order that the regulating mechanism may be locked in any desired position, there is provided a member 88 threaded through openings in the boss portion 87 and the sleeve member 65 to engage the member 64. An operating handle 89 is provided for manually adjusting the member 88 into its clamped and released positions.

Figure 5:
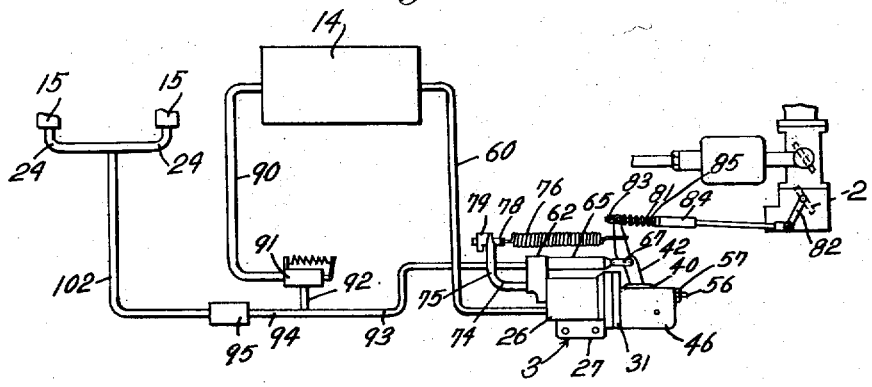
Fig. 5 is a schematic diagram showing the regulating mechanism connected into the compressor control system.
Figure 6:
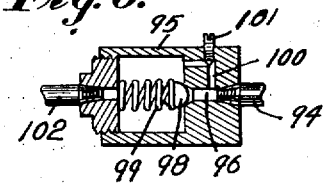
Fig. 6 is an enlarged sectional view through a valve mechanism connected in the control system of Fig. 5.

As shown in Fig. 5, the receiver 14 is connected by a conduit 90 to a pilot valve 91 of a well-known type which operates at a predetermined maximum pressure for connecting the conduit 90 in communication with a conduit 92, and which operates at a predetermined lower pressure for connecting the conduit 92 in communication with the atmosphere. The conduit 92 is connected to conduits 93 and 94 communicating respectively with the passage 70 extending through the member 64 and with a valve casing 95. The valve casing 95, as shown in Fig. 6. is provided with a passage 96 connecting the conduit 94 in communication with the interior of the casing past a ball valve 98 which is yieldably held in its closed position by a spring 99. A passage 100 also connects the conduit 94 in communication with the interior of the casing, and an adjustable member 101 is provided for restricting the flow of fluid through the passage 100. The interior of the casing is connected by a conduit 102 in communication with the conduit 24 leading to the plunger 18 of the compressor unloading mechanism. As shown in the diagram of Fig. 5, two conduits 24 are provided leading to compressor unloading mechanisms, the compressor in this case having two cylinders. Of course, in practice, this number would usually be exceeded.

The point at which the speed regulating mechanism starts to slow down the engine is determined by the [tension on] *resistance to movement of the lever 42 exerted by* the spring 76, this being adjusted by varying the position of the spring on the toothed portion of the lever 42 and by regulating the nut 79 until operation is obtained at the desired pressure. The compressor may be driven at a maximum speed, say 1200 R. P. M., until, say, a pressure of 90 pounds is reached, this being the pressure at which it is proposed that the spring 76 be adjusted to commence to yield to the force exerted on the lever 42 by the bellows device 32. As the receiver pressure continues to increase, the bellows device will be compressed and cause the control lever 42 to swing about the pivot pin 52 and move the rod 81 in a direction to close the throttle valve 2. The characteristics and adjustment of the spring 76 may also desirably be made such that under the conditions selected for purposes of illustration, the control lever 42 will be moved, on an increase in receiver pressure to 95 pounds, to a point where the throttle valve will be sufficiently [restricted] *closed* to reduce the speed of the engine to, say, approximately 800 R. P. M. The screw 56 is so adjusted that it is engaged by the outer end of the elongated member 38 just as the receiver pressure of 95 pounds is reached. The control lever 42 will then be held by the screw 56 against further movement by the bellows device 32 in a direction to restrict the supply of operating fluid to the engine, and the engine will continue to operate at approximately 800 R. P. M. even though the receiver pressure may slightly increase. When the receiver pressure increases to the maximum desired value, say 100 pounds, the pilot valve 91 operates to supply pressure fluid from the receiver through the conduits 90, 92, 93 and the passage 70 to the inner end of the sleeve member 65. The pressure fluid acting on the sleeve member 65 causes the latter to move outwardly and swing the control lever 42 about the pivot pin 44 in a direction to restrict further the supply of actuating fluid to the internal combustion engine. The abutment pin 86 is desirably adjusted, under the conditions selected for purposes of illustration, to limit the outward movement of the sleeve member 65 to a point where the restriction by the throttle valve 2 is such that the engine is reduced to an idling speed of 450 R. P. M. As the control lever swings about the pivot pin 44, the lower end of the control lever will swing to the left[, as shown] in Fig. 2, and move the plunger 48 against the action of the spring 53. At the same time that the pressure fluid flows from the conduit 92 to the conduit 93, it also flows to the conduit 94 and is conducted to the valve mechanism 95 where it acts to unseat the ball valve 98. The fluid flows freely past the ball valve to the conduit 102 which conducts it to the conduits 24 communicating with the unloading mechanisms for the compressor cylinders.

It will be seen that the compressor will be immediately unloaded and will continue to be driven unloaded at an idling speed as long as pilot valve 91 remains in its open position. When the receiver pressure drops to a predetermined lower value, for instance 95 pounds, the pilot valve operates to vent the conduit 92 to atmosphere. Pressure fluid then escapes immediately from the interior of the sleeve member 65 and the spring 76 swings the control lever about the pivot pin 44 until the plunger 48 at the lower end of the control lever is moved into engagement with the pin 54. The bellows device 32 is held compressed by the 95 pounds pressure so that the outer end of the member 38 continues to engage the pin [54] *56* and holds the control lever against swinging movement about the pin 52. The position of the control lever at this time is such that the engine speed is increased to 800 R. P. M. The escape of fluid from the unloading mechanism is restricted since the ball valve 98 moves to its closed position and the pressure fluid can escape only through the passage 100 to the conduit 94. By the time the pressure fluid has escaped from the unloading mechanisms and the compressor cylinders have been reloaded, the driving engine will already have increased to 800 R. P. M. and will continue to drive the compressor loaded at this speed unless there is a further drop in receiver pressure. If the receiver pressure continues to drop, the reduction of pressure on the bellows device 32 will result in a swinging of the control lever about the pin 52 in a direction to open further the throttle valve 2 and cause the engine to increase its speed.

Figure 7:
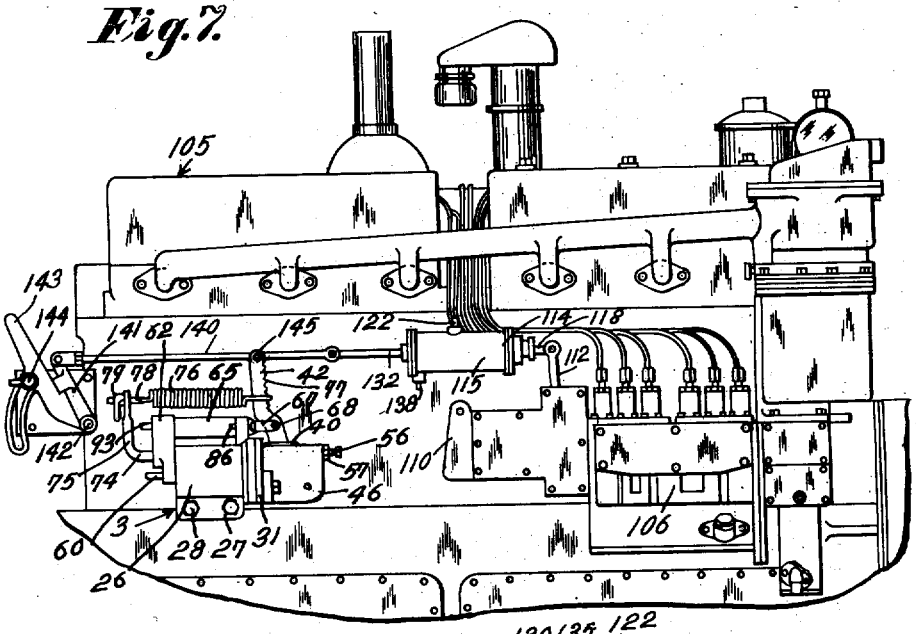
Fig. 7 is a side elevational view of a Diesel engine having the improved regulating means of Figs. 1 to 3 associated therewith.
Figure 8:
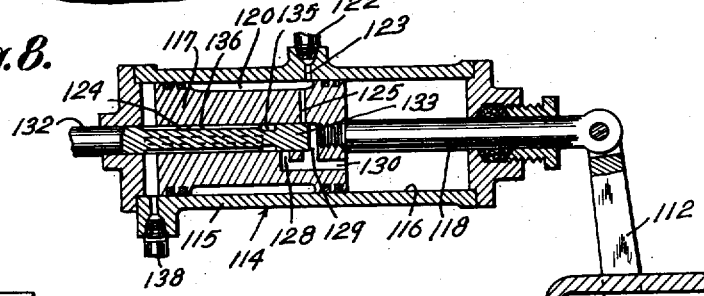
Fig. 8 is an enlarged vertical sectional view through a portion of the regulating means for the fuel pump of the Diesel engine and a servomotor for controlling the operation of the pump regulating means.
Figure 9:
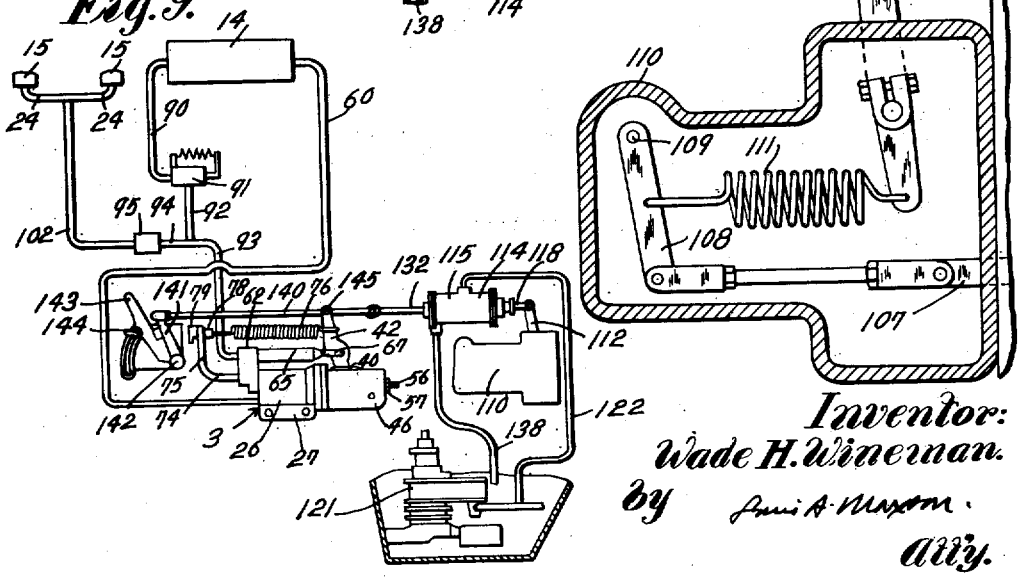
Fig. 9 is a schematic diagram showing the improved regulating mechanism connected in the control system for a Diesel engine operated compressor.

In Figs. 7, 8, 9, there is shown a regulating mechanism, like that of Figs. 1 to 6, connected to a Diesel engine 105 for controlling the supply of operating fluid to the latter.

*The speed of Diesel engines is conventionally controlled by varying the quantity of fuel injected by their fuel pumping means, and this variation is accomplished, through well known mechanism, by the opposite movements of a control element which a speed responsive mechanism tends to move in one direction and whose movements in such direction are yieldingly resisted. By controlling the yielding resistance-providing means to change the resistance it provides, the engine speed may be variably controlled.*

The engine *shown* is provided with the usual fuel pump 106 having a conventional control mechanism which includes, as shown in Fig. 8, a control [rod] *element* 107 *with which a speed responsive mechanism (not shown) coacts and which such mechanism tends to move towards the left in Fig. 8.* The *left-hand* end of the control

[rod] *element* is connected to the lower end of an arm 108 which is pivotally supported at its upper end by a pin 109 fixed to a casing 110. A spring 111 is connected at one end to the arm 108 between the ends of the latter and is connected at its other end to the lower end of a lever 112 which is pivotally supported between its ends by the casing 110. In Fig. 8 the lever 112 is shown in what may be called full-load position, and movements of the lever clockwise in Fig. 8 effect a slowing down of the engine and compressor. Considerable force is required to swing the lever 112 about its pivotal mounting in a counter-clockwise direction and so there is provided a servomotor, generally designated 114, operatively connected to the lever 112 and controlled in its operation by the regulating mechanism 3.

The servomotor includes a cylinder member 115 having a bore 116 which slidably receives a piston 117 connected by a rod 118 to the upper end of the lever 112. The piston is provided with an elongated annular groove 120 in its periphery, and pressure fluid is supplied to this annular groove by a hydraulic pump 121 arranged, as shown in Fig. 9, in the crankcase of the engine and connected by a conduit 122 to a port 123 opening into the bore 116 between the ends of the latter. The piston 117 is provided with an axial bore 124 and a radial passage 125 connecting the groove 120 to the bore 124 at a point adjacent the inner end of the latter. Radial passages 128 and 129 open into the bore 124 at longitudinally spaced points and are connected by a passage 130 to the space within the bore 116 at the right-hand end of the piston 117. Slidably received within the bore 124 is a piston member 132 having a head portion 133 which is adapted to control the communication of the passages 125 and 128 with the bore 124. Formed in the piston member 132 is an annular groove 135 which is adapted to connect the passage 128 in communication with grooves 136 extending longitudinally in the outer periphery of the piston member to points where they communicate with the bore 116 at the left-hand end of the piston when the annular groove 135 communicates with the passage 128. The passages 125, 128 and 129 are so arranged that a movement of the piston member 132 to the left covers the passage 128 and uncovers the passage 125 permitting fluid to flow from the passage 125 to the bore 124 where it enters the passage 129 and is conducted to the cylinder bore 116 at the right-hand side of the piston. When the piston member 132 is moved to the right, the passage 125 is covered by the head portion 133 and the passage 128 is connected in communication with the annular groove 135 so that the space in the bore 116 at the right-hand end of the piston is vented through the passages 130, 128, the annular groove 135, and the grooves 136 to the bore 116 at the left-hand end of the piston where it is drained away through a conduit 138 leading to the crankcase of the engine.

The piston member 132 is shown herein as forming a portion of a rod 140 which is connected, as shown in Fig. 7, to an arm 141 pivoted at 142 in any suitable way on a stationary axis. A manually controlled arm 143 is movable to control the position of the arm 141 and is securable by a nut 144 in different positions to limit the maximum speed of the unit if desired. Normally, however, the arm 143 remains in the position shown in Fig. 7, and the rod 140 is controlled exclusively by the regulating mechanism through the control lever 42 which is pivotally connected at 145 to the rod 140.

The operation of the regulating mechanism is the same as that described above. As the control lever 42 swings in a clockwise direction, the rod 140 moves with the lever and positions the piston member 132 so that its portion 133 covers the passage 125 and uncovers the passage 128 connecting the latter to the groove 135 so as to vent liquid from the righthand end of the bore 116. The spring 111 then causes the arm 112 to swing about its pivotal support and move the piston 117 to the right until the passage 128 is again covered by the piston portion 133 and the escape of fluid from the right-hand end of the cylinder bore is cut off. This swinging of the lever 112 reduces the tension of the spring 111 and so effects a slowing down of the Diesel engine, since the control [rod] *element* 107 can the more readily be moved to the left. When the control lever 42 swings in a counter-clockwise direction, the portion 133 of the piston member is moved to a position covering the passage 128 and uncovering the inner end of the passage 125 so that fluid flows under pressure from the groove 120 through the passage 125, the bore [126] *124*, and the passages 129 and 130 to the bore 116 at the right-hand end of the piston where it acts on the latter to effect its movement in a direction to swing the lever 112 about its pivot for [reducing] *increasing* the supply of operating fluid to the engine.

Figure 10:
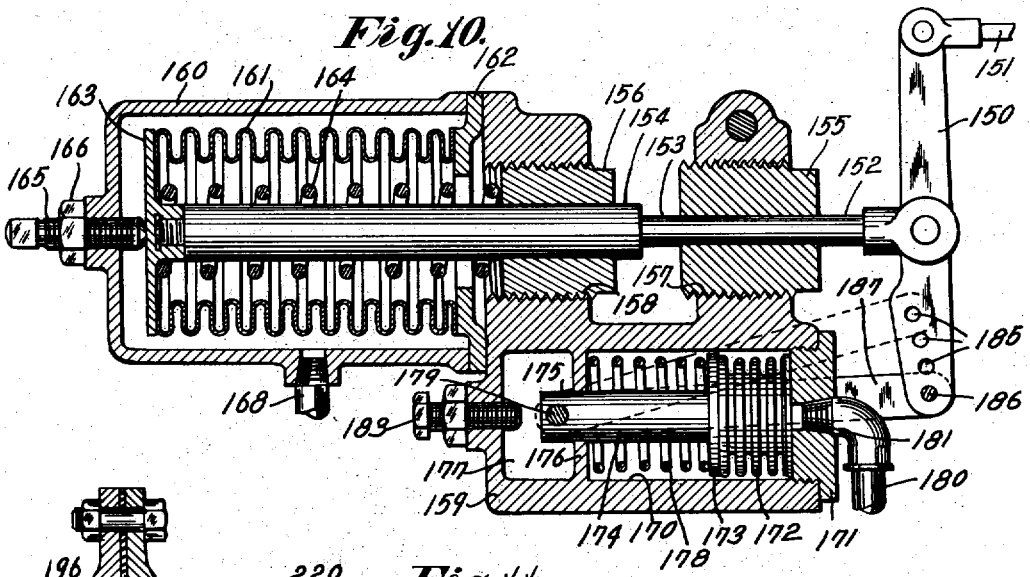
Figs. 10, 11 and 12 are central sectional views showing modified forms of the regulating mechanism.

In Fig. 10, there is shown a modification of the invention in which a control lever 150 is pivotally connected at its upper end to a rod 151 which may be connected directly to the throttle valve of an internal combustion engine, as shown in Figs. 1 to 6, or to a servomotor which operates control means for a Diesel engine, as shown in Figs. 7 to 9. The lever 150 is pivotally connected at a point between its ends to a rod 152 having stepped portions 153 and 154 which are slidably supported by bushings 155 and 156 threadedly mounted in openings 157 and 158 formed in upwardly projecting portions of a block 159. Connected to one end of the block 159 in alinement with the bushings 155 and 156 is a casing 160 containing a bellows device 161 which is connected, as by brazing, at one end to an annular plate member 162 clamped between the casing 160 and the block 159 and at its other end to a movable plate member 163. The rod portion 154 extends axially through the bellows device and is connected at its end to the plate member 163, as shown. A spring 164 surrounds the rod portion 154 and acts between the bushing 156 and the movable plate 163 for holding the bellows device normally expanded with the plate member 163 held in engagement with an adjustable bolt 165 having a lock nut 166. Pressure fluid is supplied continuously from the receiver through a conduit 168 to the space in the casing 160 surrounding the bellows device. Formed in the block 159 is a chamber 170 which is [en]closed at one end by a cover plate 171, and arranged within the chamber 170 is a bellows device 172 which is connected, as by brazing, soldering, etc., at one end to the cover plate 171 and at its other end to a movable plate 173. Formed on the plate 173 is a projecting portion 174 which extends through an opening 175 in a partition 176 separating the inner end of the chamber 170 from [a chamber] *an opening* 177. A spring 178 acts between the inner end of the chamber 170 and the plate 173 for holding the bellows device 172 normally compressed. A pin 179 projects radially from the projecting portion 174 and is engageable with the partition 176 for limiting the compression of the bellows device 172. A conduit 180 is connected through an opening 181 in the cover plate 171 in communication with the interior of the bellows device 172 and supplies pressure fluid from a pilot valve, such as that shown in Fig. 5, to the interior of the bellows when the receiver pressure reaches a predetermined maximum value. Threaded into an opening in the block in alinement with the projecting portion 174 is a bolt 183 which is engageable by the projecting portion for limiting the expansion of the bellows device 172. The lower end of the lever 150 is provided with several openings 185 for selectively receiving a pivot pin 186 to which one end of a pair of links 187 are connected. The other end of the links 187 are operatively connected to the plate member 173 *by reason of their pivotal connection to the opposite ends of the pin 179 carried by the projecting portion 174 on the plate 173.*

It will be seen that the pressure fluid acting on the exterior of the bellows device 161 operates to compress the latter against the force of the spring 164 and to move the rod 152 in a direction to swing the control lever about the pivot pin 186. The shoulder formed at the juncture of the stepped portions 153 and 154 of the rod 152 engages the bushing 155 and limits the swing of the lever 150 in a clockwise direction *upon the pivot pin 186.* The adjustment of the bushing 155 within the opening 157 therefore determines the minimum speed that may be obtained through the compression of the bellows device 161. By adjusting the bushing 156 to vary the compression of the spring 164, the operation of the bellows device 161 may be obtained at any desired pressure. The adjustment of the bolt 165 determines the distance that the control lever may be swung in a counter-clockwise direction *upon the pivot pin 186* and therefore the maximum speed of the driving engine. After the receiver pressure has increased to the point where the rod 152 is moved to its extreme right-hand position for reducing the speed of the engine, no further change will take place until the receiver pressure has increased to the point at which the pilot valve opens and supplies pressure fluid through the conduit 180 to the interior of the bellows device 172. On the supply of pressure fluid to the interior of this bellows, the plate member 173 is forced to the left until its projecting portion 174 engages the bolt 183. The movement of the plate member 173 to the left causes the links 187 to swing the lever 150 in a clockwise direction about its pivotal connection to the rod 152 and actuate the rod 151 to effect a further slowing down of the engine to an idling speed.

Figure 11:
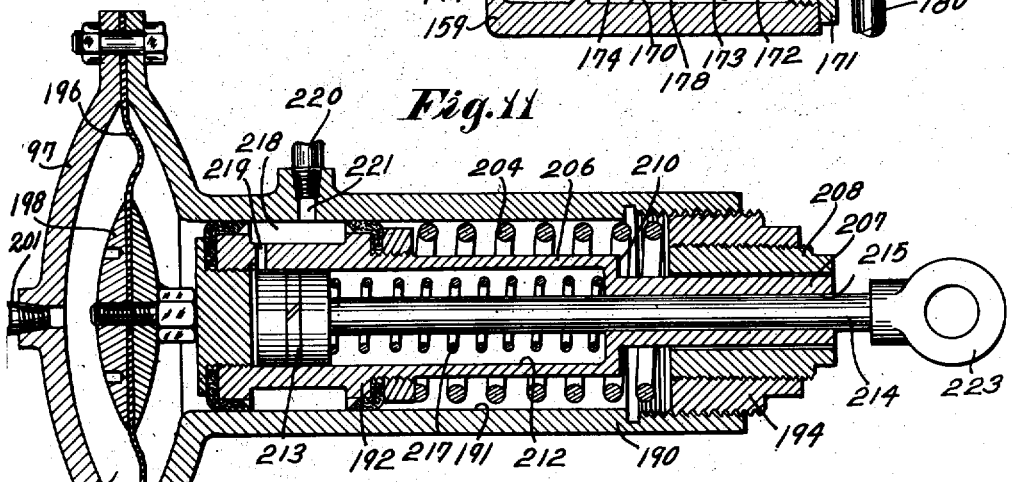

In the form of the invention shown in Fig. 11 there is provided a cylinder member 190 having a bore 191 which reciprocably receives a piston member 192. The cylinder 190 has an annular member 194 threaded into one of its ends and is provided at its other end with a flared portion 195. A diaphragm 196 is clamped between the flared portion 195 and a cap 197, and reinforcing plates 198 are clamped to opposite sides of the diaphragm by a bolt 199 having its head engageable with the piston 192. The cap 197 and the flared portion 195 form a chamber 200 which permits substantial movement of the diaphragm 196 and its reinforcing plates 198. Pressure fluid is supplied continuously from the receiver through a conduit 201 to the chamber 200 at the side of the diaphragm opposite the piston 192. A spring 204 acts between the piston 192 and the annular member 194 for resisting movement of the piston by the diaphragm. The piston 192 is provided with axially projecting stepped portions 206 and 207, the portion 207 extending loosely through an annular member 208 which is threaded into the annular member 194. The shoulder 210 at the juncture of the stepped portions 206 and 207 is engageable with the member 208 for limiting movement of the piston 192 by the diaphragm 196. The piston 192 and its larger projecting portion 206 [is] *are* provided with an axial bore 212 which slidably receives a piston 213 having a piston rod 214 which is slidably received within an opening 215 extending axially through the projecting portion 207. A spring 217 acts between one end of the bore 212 and the piston 213 for holding the latter normally at the left-hand end of the bore. The piston 192 is provided with an annular groove 218 in its periphery and a radial passage 219 connecting the groove 218 in communication with the bore 212. A conduit 220 is connected by a port 221 in the cylinder member 190 [is] *in* communication with the bore 191 at a point to communicate with the groove 218 when the piston 192 is in any of its various positions, and pressure fluid is supplied from the receiver to the conduit 220 under the control of a pilot valve. The piston rod 214 is provided with a member 223 to which suitable regulating means for an engine may be connected.

The operation of this form of regulating means is as follows: As the receiver pressure increases and finally moves the diaphragm 196 to the right forcing the piston 192 with it against the action of the spring 204, the piston 213 moves with the piston 192 in a direction to cause an actuation of the fluid regulating means connected to the rod 214 so as to slow down the driving engine. When the shoulder 210 is moved into engagement with the annular member 208, further movement of the piston 192 by the diaphragm 196 will be prevented. The engine will then operate at a reduced speed until the receiver pressure increases to the point at which the pilot valve opens and supplies fluid through the conduit 220 to the annular groove 218 in the piston 192. Pressure fluid supplied to this groove flows through the radial passage 219 to the bore 212 at the left-hand end of the piston 213 where it acts on the piston and causes the latter to move to the right within the bore 212 against the action of the spring 217 and effect a slowing down of the engine to an idling speed. Equalization of pressure at the right of piston 213 with that at the left, due to leakage, is prevented by reason of the existence of adequate space for leakage around the rod 214.

Figure 12:
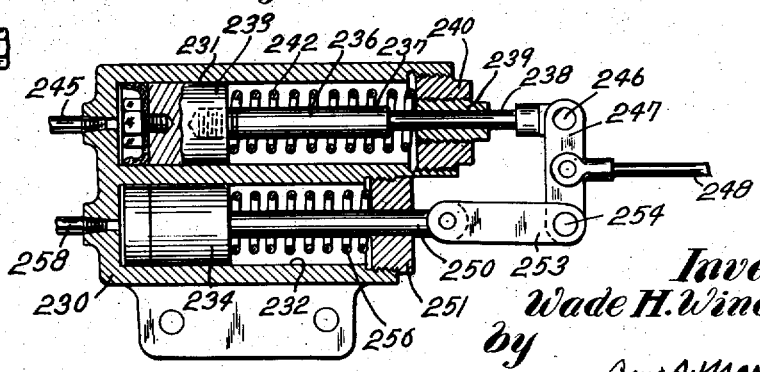

In Fig. 12, there is shown another modification of the invention in which a block 230 is provided with parallel bores 231 and 232 containing pistons 233 and 234. The piston 233 is provided with a piston rod 236 having stepped portions 237 and 238, the portion 238 extending through an opening in an annular member 239 which is threadedly received in an annular member 240 threaded into the right-hand end of the bore 231. A spring 242 acts between the annular member 240 and the piston 233 for holding the latter normally at the left-hand end of the bore 231. The shoulder formed at the juncture of the stepped portions 237 and 238 is engageable with the annular member 239 for limiting movement of the piston 233 to the right within the bore 231. Receiver pressure is supplied continuously through a conduit 245 to the left-hand end of the bore 231 where it acts on the piston 233 and tends to move the latter to the right against the action of the spring 242. The outer end of the piston rod 236 is pivotally connected at 246 to one end of a control lever 247 which is pivotally connected between its ends to a control rod 248. The piston 234 is provided with a piston rod 250 which extends through a plug 251 closing the right-hand end of the bore 232 and is connected at its outer end to a link 253 which is pivotally connected at 254 to the lower end of the lever 247. A spring 256 acts between the piston 234 and the plug 251 for urging the piston 234 toward the left-hand end of the bore 232. A conduit 258 communicates with the left-hand end of the bore 232 and is adapted to be connected in communication with a a receiver or with atmosphere under the control of a pilot valve.

The receiver pressure acting continuously on the piston 233 forces the latter *to the right* against *the resistance opposed by* the spring 242, as the receiver pressure increases, and causes the lever 247 to swing about the pivot connection 254 and move the control rod 248 in a direction to restrict the supply of operating fluid to the driving engine. The tension of the spring 242 may be adjusted by [regulating] *adjusting* the annular member 240 so that operation of the piston 233 is obtained at the desired pressure values, and the distance that the piston may move to the right is determined by the adjustment of the annular member 239. When the receiver pressure reaches the predetermined maximum value and the pilot valve operates to supply pressure fluid through the conduit 258 to the bore 232, the piston 234 is forced to the right against the action of the spring [242] *256* and causes the lever 247 to swing about its pivot connection 246 and move the rod 248 in a direction to restrict further the supply of operating fluid to the driving engine. With each of the last two species of the invention a stop for the motion of the throttle or other control device can be provided to limit the movements effected by the rods 214 and 250 under fluid pressure applied to their pistons.

As a result of my invention there is provided an improved mechanism for regulating the supply of operating fluid to a driving engine for a compressor. The regulating mechanism is very compact and is readily adjusted to operate at the desired pressures for effecting a regulating of the engine speed in an improved manner. In each of the forms of the invention a single element is actuated by a plurality of pressure responsive devices for regulating the supply of operating fluid to the engine. The adjustments provided permit the element to respond to the pressure responsive devices within any desired pressure range for varying the speed of the engine. In each case the control element is actuated by one of the pressure responsive devices to effect a gradual variation in the speed of the engine as the pressure changes through a predetermined range, and is actuated by another pressure responsive device to slow down the engine to an idling speed when the pressure reaches a predetermined maximum value.

While there are in this application specifically described several forms which the invention may assume in practice, it will be understood that these forms of the same are shown for purposes of illustration, and that the invention may be modified and embodied in various other forms without departing from its spirit, or the scope of the appended claims.

What I claim as new and desire to secure by Letters Patent is:

1. A speed regulating mechanism for a motor driven compressor comprising, in combination, means including a control element movable to vary the supply of operating fluid to the motor, means for yieldingly urging said control element in a direction to increase the supply of operating fluid, a plurality of pressure responsive devices *supported to act in like direction under the action of fluid pressure thereon,* for moving said control element against the action of said yielding means, said yielding means providing substantially the entire resistance to movement of said pressure responsive devices, means for subjecting one of said pressure responsive devices continuously to compressor discharge pressure, and means for subjecting another of said pressure responsive devices to compressor discharge pressure when a predetermined maximum pressure is reached.

2. A speed regulating mechanism for a motor driven compressor comprising, in combination, means including a pivoted control lever for regulating the supply of operating fluid to the motor, a plurality of fluid pressure responsive devices supported to act in like direction, under the action of fluid pressure thereon, [and pivotally connected to] *upon* said control lever at points spaced longitudinally of the latter but at the same side of the pivot thereof, means for subjecting one of said pressure responsive devices continuously to compressor discharge pressure, and means for subjecting another of said pressure responsive devices to compressor discharge pressure when a predetermined maximum pressure is reached.

3. A speed regulating mechanism for a motor driven compressor comprising, in combination, means including a control lever for regulating the supply of operating fluid to the motor, a support member pivotally supporting said control lever at one end of the latter, means for supporting said member for limited bodily movement in a direction transversely of said control lever, a plurality of pressure responsive devices [pivotally connected to] *for acting upon* said control lever at points spaced longitudinally of the latter, means for subjecting one of said pressure responsive devices continuously to compressor discharge pressure, and means for subjecting another of said pressure responsive devices to compressor discharge pressure when a predetermined maximum pressure is reached.

4. A speed regulating mechanism for a motor driven compressor comprising, in combination, means including a control lever for regulating the supply of operating fluid to the motor, a support member pivotally supporting said control lever at one end of the latter, means for supporting said member for limited bodily movement in a direction transversely of said control lever, means for yieldably resisting the swinging of said control lever in one direction about said support member, a pair of pressure responsive devices [pivotally connected to] *for acting upon* said lever at points spaced longitudinally thereof and operative on the supply of pressure fluid thereto for swinging said lever against the action of said yielding means, means for subjecting one of said pressure responsive devices continuously to compressor discharge pressure, and means for subjecting the other of said pressure responsive devices to compressor discharge pressure when a predetermined maximum pressure is reached.

5. A speed regulating mechanism for a motor driven compressor comprising, in combination, means including a control lever for regulating the supply of operating fluid to the motor, a support member pivotally supporting said control lever at one end of the latter, means for supporting said member for limited bodily movement in a direction transversely of said control lever, means for yieldingly urging said control lever in a direction to increase the supply of operating fluid to the motor, a pair of pressure responsive devices [pivotally connected to] *for acting upon* said lever at points spaced longitudinally thereof different distances from said support member and operative on the supply of pressure fluid thereto for swinging said control lever against the action of said yielding means, means for limiting the swinging of said control lever by said pressure responsive devices, means for subjecting one of said pressure responsive devices continuously to compressor discharge pressure, and means for subjecting the other of said pressure responsive devices to compressor discharge pressure when a predetermined maximum pressure is reached.

6. A speed regulating mechanism for a motor driven compressor comprising, in combination, means including a control lever for regulating the supply of operating fluid to the motor, a support member pivotally supporting said control lever at one end of the latter, means for supporting said member for limited bodily movement in a direction transversely of said control lever, means for yieldingly urging said control lever in a direction to increase the supply of operating fluid to the motor, a pair of pressure responsive devices [pivotally connected to] *for acting upon* said lever at points spaced longitudinally thereof different distances from said support member and operative on the supply of pressure fluid thereto for swinging said control lever against the action of said yielding means, means for limiting the swinging of said control lever by said pressure responsive devices, means for subjecting the one of said pressure responsive devices nearer to said support member continuously to compressor discharge pressure, and means for subjecting the other of said pressure responsive devices to compressor discharge pressure when a predetermined maximum pressure is reached.

7. A speed regulating mechanism for a motor driven compressor comprising, in combination, means including a control lever for regulating the supply of operating fluid to the motor, a support member pivotally supporting said control lever at one end of the latter, means for supporting said member for limited bodily movement in a direction transversely of said control lever, means for yieldingly urging said control lever in a direction to increase the supply of operating fluid to the motor, a pair of pressure responsive devices [pivotally connected to] *for acting upon* said lever at points spaced longitudinally thereof different distances from said support member and operative on the supply of pressure fluid thereto for swinging said control lever against the action of said yielding means, means for subjecting the one of said pressure responsive devices nearer to said support member continuously to compressor discharge pressure, adjustable means for limiting the swinging of said lever by said pressure responsive device, means for subjecting the other of said pressure responsive devices to compressor discharge pressure after the limit of swing of said lever by said first mentioned pressure responsive device has been reached.

8. A speed regulating mechanism for a motor driven compressor comprising, in combination, a control lever for regulating the supply of operating fluid to the motor, a support member pivotally supporting said control lever at one end of the latter, means for supporting said support member for limited bodily movement in a direction transversely of said lever, yieldable means operatively connected to said lever at a point adjacent its other end for urging said lever in a direction to increase the supply of operating fluid to the motor, a pair of pressure responsive devices operatively connected to said lever between said support member and said yieldable means and at points spaced different distances from said support member, said pressure responsive devices operative to swing said lever in a direction to reduce the supply of operating fluid to the motor, means for subjecting one of said pressure responsive devices continuously to compressor discharge pressure, means for subjecting the other of said pressure responsive devices to compressor discharge pressure after a predetermined maximum pressure is reached, and adjustable means for limiting the swinging of said lever by each of said pressure responsive devices.

9. A speed regulating mechanism for a motor driven compressor comprising, in combination, a control lever for regulating the supply of operating fluid to the motor, a support member pivotally supporting said control lever at one end of the latter, means for supporting said support member for limited bodily movement in a direction transversely of said lever, yieldable means operatively connected to said lever at a point adjacent its other end for urging said lever in a direction to increase the supply of operating fluid to the motor, a pair of pressure responsive devices operatively connected to said lever between said support member and said yieldable means and at points spaced different distances from said support member, said pressure responsive devices operative to swing said lever in a direction to reduce the supply of operating fluid to the motor, means for subjecting the one of said pressure responsive devices *operatively* connected to said lever at the point nearer said support member continuously to compressor discharge pressure, adjustable means for limiting the swinging of said lever by said pressure responsive device, and means for subjecting the other of said pressure responsive devices to compressor discharge pressure after the swing of the lever by said first pressure responsive device has been limited by said adjustable means.

10. A speed regulating mechanism for a motor driven compressor comprising, in combination, a control lever for regulating the supply of operating fluid to the motor, a support member pivotally supporting said control lever at one end of the latter, means for supporting said support member for limited bodily movement in a direction transversely of said lever, a pair of pressure responsive devices operatively connected to said lever at points spaced longitudinally thereof different distances from said support member and operative by pressure fluid for swinging said lever in a direction to reduce the supply of operating fluid to the motor, means for subjecting the one of said pressure responsive devices *operatively* connected to the lever at the point nearer said support member continuously to compressor discharge pressure, adjustable means for limiting the swing of said lever by said pressure responsive device, means for subjecting the other of said pressure responsive devices to compressor discharge pressure after such compressor discharge pressure has increased to a value above that at which movement of said lever by the first of said pressure responsive devices is limited.

11. A speed regulating mechanism for an engine driven compressor comprising, in combination, a control lever, means operatively connecting said lever at one end to fuel regulating means for the engine, a pair of pressure responsive devices [pivotally] *operatively* connected to said lever at points spaced longitudinally thereof different distances from said connecting means, *said pressure responsive devices having surfaces to be subjected to compressor discharge pressure to effect lever movement and said surfaces facing in the same direction,* means for subjecting the one of said pressure responsive devices connected to said lever nearer said connecting means continuously to compressor discharge pressure, and means for subjecting the other of said pressure responsive devices to compressor discharge pressure when a predetermined maximum pressure is reached.

12. A speed regulating mechanism for an engine driven compressor comprising, in combination, a control lever, means operatively connecting said lever at one end to fuel regulating means for the engine, a pair of pressure responsive devices [pivotally] *operatively* connected to said lever at points spaced longitudinally thereof different distances from said connecting means and each operative by pressure fluid supplied thereto to swing said lever about its [pivotal] connection to the other in a direction to effect a reduction of fuel supply to the engine, means for subjecting the one of said pressure responsive devices connected to said lever nearer said connecting means continuously to compressor discharge pressure, and means for subjecting the other of said pressure responsive devices to compressor discharge pressure when a predetermined maximum pressure is reached.

13. A speed regulating mechanism for an engine driven compressor comprising, in combination, a control lever, means operatively connecting said lever at one end to fuel regulating means for the engine, a pair of pressure responsive devices [pivotally] *operatively* connected to said lever at points spaced longitudinally thereof different distances from said connecting means and each operative by pressure fluid supplied thereto to swing said lever about its [pivotal] connection to the other in a direction to effect a reduction of fuel supply to the engine, means for limiting the operation of the one of said pressure responsive devices connected to said lever nearer said connecting means by the pressure fluid supplied thereto, means for subjecting said last mentioned pressure responsive device continuously to compressor discharge pressure, and means for subjecting the other of said pressure responsive devices to compressor discharge pressure after such compressor discharge pressure has increased to a value above that at which operation of the first mentioned pressure responsive device is limited.

14. A speed regulating mechanism for an engine driven compressor comprising, in combination, a control lever, means operatively connecting said lever at one end to fuel regulating means for the engine, a pair of pressure responsive devices [pivotally] *operatively* connected to said lever at points spaced longitudinally thereof different distances from said connecting means and each operative by pressure fluid supplied thereto to swing said lever about its [pivotal] connection to the other in a direction to effect a reduction of fuel supply to the engine, adjustable means for limiting the operation in each direction of the one of said pressure responsive devices connected to said lever nearer said connecting means, means for subjecting said last mentioned pressure responsive device continuously to compressor discharge pressure, means for subjecting the other of said pressure responsive devices to compressor discharge pressure after such compressor discharge pressure has increased to a value above that at which movement of the first pressure responsive device by the fluid supplied thereto is limited, and adjustable means for limiting the operation of said other pressure responsive device by the pressure fluid supplied thereto.

15. A speed regulating mechanism for an engine driven compressor comprising, in combination, a control lever, means operatively connecting said lever at a point between its ends to fuel regulating means for the engine, a pair of pressure responsive devices [pivotally] *operatively* connected to said lever at points spaced longitudinally thereof and at opposite sides of said connecting means, means for subjecting one of said pressure responsive devices continuously to compressor discharge pressure, and means for subjecting the other of said pressure responsive devices to compressor discharge pressure when a predetermined maximum pressure is reached.

16. A speed regulating mechanism for an engine driven compressor comprising, in combination, a control lever, means operatively connecting said lever at a point between its ends to fuel regulating means for the engine, a pair of pressure responsive devices [pivotally] *operatively* connected to said lever at points spaced longitudinally thereof and at opposite sides of said connecting means and each operative by pressure fluid supplied thereto to swing said lever about its pivotal connection to the other in a direction to effect a reduction of fuel supply to the engine, means for subjecting one of said pressure responsive devices continuously to compressor discharge pressure, and means for subjecting the other of said pressure responsive devices to compressor discharge pressure when a predetermined maximum pressure is reached.

17. A speed regulating mechanism for an engine driven compressor comprising, in combination, a control lever, means operatively connecting said lever at a point between its ends to fuel regulating means for the engine, a pair of pressure responsive devices [pivotally] *operatively* connected to said lever at points spaced longitudinally thereof and at opposite sides of said connecting means and each operative by pressure fluid supplied thereto to swing said lever about its pivotal connection to the other in a direction to effect a reduction of fuel supply to the engine, means for subjecting one of said pressure responsive devices continuously to compressor discharge pressure, means for limiting the operation of this pressure responsive device by pressure fluid, and means for subjecting the other of said pressure responsive devices to compressor discharge pressure after such compressor discharge pressure has increased to a value above that at which operation of the first pressure responsive device is limited.

18. In a speed regulating mechanism for an engine driven compressor in which throughout the range of loaded operating speeds a speed responsive governor variably controls the speed of a compressor as the force opposed to the action of the driving engine governor is varied, in combination, a control element movable to vary the force opposed to the action of the governor to cause the latter to exercise a variable speed control, and means for moving said control element in a direction to reduce the force opposed to the action of the governor and to permit the latter to reduce the operating speed of the compressor including a plurality of pressure responsive devices each movable by the action of fluid pressure thereon to effect movement of said control element in said direction, means for subjecting one of said devices continuously to compressor discharge pressure, and means for subjecting another of said pressure responsive devices to compressor discharge pressure only when a predetermined maximum pressure is reached.

19. In a speed regulating mechanism for a motor driven compressor, in combination, means including [a control] *an* element movable to regulate the supply of operating fluid to the compressor driving motor, a plurality of pressure responsive devices each movable under fluid pressure to alter the position of said [control] element to effect slowing down of said engine, means for subjecting one of said pressure responsive devices continuously to compressor discharge pressure, means for subjecting another of said pressure responsive devices to compressor discharge pressure when a predetermined maximum pressure is reached, a member [pivotally] *operatively* connected to said [control] element *to move the latter* and upon which said pressure responsive devices act at different points, a speed responsive device having *yielding* means for opposing its operation in response to speed increases, and means operated by said [member] *element* for varying the action of said [last mentioned] *yielding* means, *whereby the movements of said element effect a regulation of the speed of the compressor driving motor.*

20. In a speed regulating mechanism for a motor driven compressor, in combination, a pressure responsive device constantly subjected to compressor discharge pressure during normal operation of the motor driven compressor and movable freely in accordance with compressor discharge pressure variations to vary the motor speed between a maximum speed desired for pumping operation and a minimum speed desired for pumping operation, said pressure responsive device including a pivoted lever having a motor speed controlling connection at *a* point spaced from its pivot, resilient means acting on said lever for resisting motion thereof in a direction to reduce motor speed and imposing on said lever a resistance to movement such as to provide a progressive reduction in motor speed as compressor discharge pressure increases, and a pressure responsive element subjected on one side thereof continuously to compressor discharge pressure and cooperating with said lever at a point between the pivot of said lever and said point spaced from said pivot, a second device movable by fluid pressure to reduce the motor speed to a value suited to idling operation, and means for delivering compressor discharge pressure to said second pressure responsive device to effect such slowing down only upon a predetermined rise in compressor discharge pressure above the value at which said minimum speed desired for pumping is imposed on the motor.

*21. A speed regulating mechanism for an engine driven compressor comprising, in combination, a control lever, means operatively connecting said lever at one end to fuel regulating means for the engine, a pair of pressure responsive devices operatively connected to said lever at points spaced longitudinally thereof different distances from said connecting means, one of said pressure responsive devices having its connection with said lever constituting a pivotal support for the latter, means for subjecting the one of said pressure responsive devices connected to said lever nearer said connecting means continuously to compressor discharge pressure, and means for subjecting the other of said pressure responsive devices to compressor discharge pressure when a predetermined maximum pressure is reached.*

*22. In a speed regulating mechanism for a motor driven compressor, in combination, a pressure responsive device constantly subjected to compressor discharge pressure during normal operation of the motor driven compressor and movable freely in accordance with compressor discharge pressure variations to vary the motor speed between a maximum speed desired for pumping operation and a minimum speed desired for pumping operation, said pressure responsive device including a pivoted lever swingable to effect motor speed variation, resilient means acting on said lever for resisting motion thereof in a direction to reduce motor speed and imposing on said lever a resistance to movement such as to provide a progressive reduction in motor speed as compressor discharge pressure increases and a pressure responsive element subjected on one side thereof continuously to compressor discharge pressure and cooperating with said lever at a point spaced from said pivot, a second device movable by fluid pressure to reduce the motor speed to a value suited to idling operation, said second device cooperating with said lever at a point thereon further than said first mentioned point from said pivot but at the same side of said pivot as said first mentioned point, and means for delivering compressor discharge pressure to said second pressure responsive device to effect such slowing down only upon a predetermined rise in compressor discharge pressure above the value at which said minimum speed desired for pumping is imposed on the motor.*

WADE H. WINEMAN.

REFERENCES CITED

The following references are of record in the file of this patent or the original patent:

UNITED STATES PATENTS

| Number | Name | Date |
|---|---|---|
| 1,812,057 | Neale | June 30, 1931 |
| 2,171,285 | Baker | Aug. 29, 1939 |
| 2,212,631 | Baker | Aug. 27, 1940 |
| 2,221,855 | Bartholomew | Nov. 19, 1940 |
| 2,255,095 | Baker | Sept. 9, 1941 |